Jan. 30, 1934. M. LAMORT 1,945,491
FILTERING APPARATUS
Filed Aug. 13, 1930  2 Sheets-Sheet 2

Inventor
Marcel Lamort
by A. B. Foster
attorney.

Patented Jan. 30, 1934

1,945,491

UNITED STATES PATENT OFFICE 1,945,491

FILTERING APPARATUS

Marcel Lamort, Vitry-le-Francois, France, assignor to Etablissements E. & M. Lamort Fils, Vitry-le-Francois, France Application February 13, 1930, Serial No. 428,168, and in France February 22, 1929

2 Claims. (Cl. 210—167)

The known filtering plants adapted for the removal of solid substances from water supplying industrial apparatus have serious drawbacks, as a general rule. Certain of these apparatus cannot be connected directly in series in the water supply circuits, but can only be employed in parallel, and hence such plants are of a complicated nature; other apparatus cannot be readily cleaned and will not assure a regular and continuous action, or will produce a partial vacuum in the piping. The major part of such apparatus are expensive and complicated, and are often of an excessive size.

The present invention enables the use of industrial filters of simple construction and operation, and they can be mounted directly in the usual plants without any change in the latter. Such apparatus can be readily cleaned, and they operate in a regular and effective manner.

In conformity to the invention, the filter is cleaned by cutting off the normal feed from a part of the filtering surface, then delivering upon the clean surface of this first part the clean liquid issuing from the other part of the filtering surface, in such manner that the said liquid will traverse the first part in the contrary direction to the normal flow, thus driving off the impurities.

To carry the invention into effect, it will suffice to employ a filtering surface, as well as means by which the feeding side of the said surface can be divided into several parts, the other sides employed for the filtered liquid being connected together.

A particular form of construction which may be employed, comprises a chamber which may be connected to a conduit supplying the liquid to be filtered or to a discharge conduit. In the said chamber is disposed a filtering chamber whose internal part is connected to the off take for filtered liquid, further employing suitable means for dividing the space between the said filtering chamber and the main chamber into two parts, which parts can be connected to the feeding conduit or to the discharge conduit.

It is preferable to employ an outer cylindrical chamber and an internal filtering chamber rotatable on the axis of the outer chamber, together with suitable separating devices secured to the periphery of the inner chamber and in contact with the inner wall of the outer chamber, thus forming partitions dividing the filtering surface into two parts.

The following description with reference to the accompanying drawings shows an embodiment of the invention.

Figure 1:
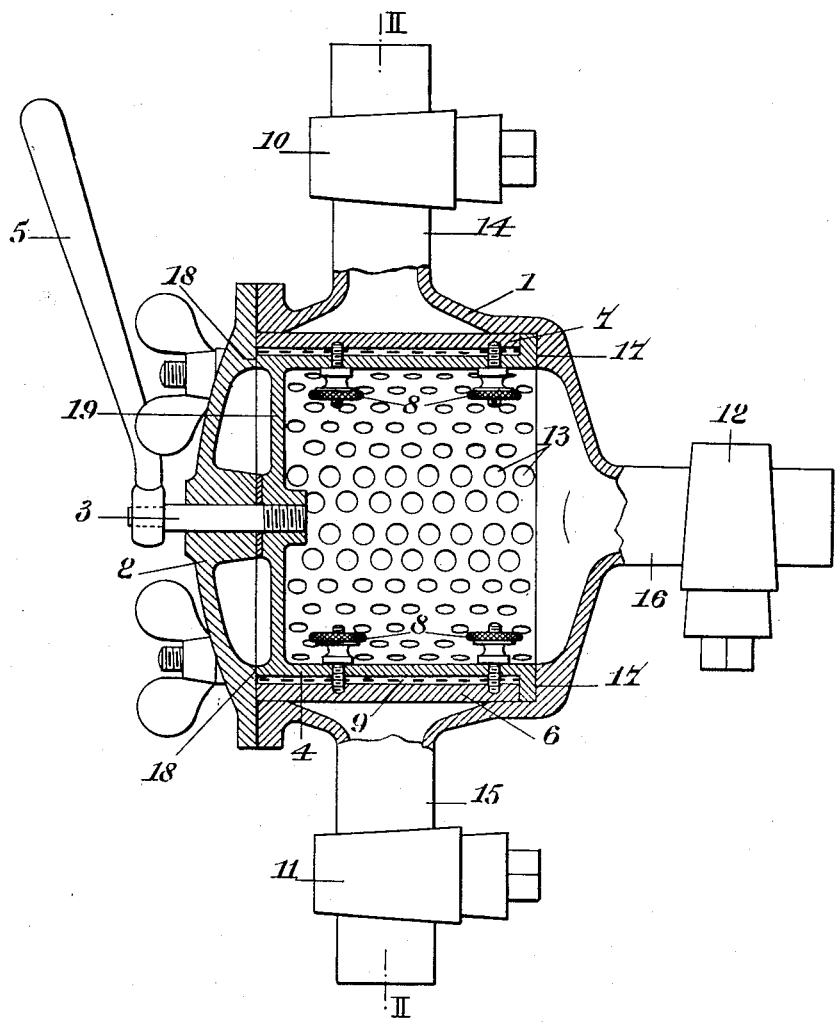
Figure 1 is a section on the axis of the apparatus.

The apparatus consists essentially of a cylindrical chamber 1 connected to three tubular conduits 14—15—16, provided with respective cocks 10—11—12. In the said chamber is a perforated hollow cylinder 4 forming the filter itself.

The said chamber 1 consists of a cylindrical main body which is closed at one side which may be considered as the top by a cover 2 forming a guide for the rod 3 actuating the internal cylinder 4 by means of the handle 5. The chamber 1 and internal cylinder 4 are so disposed that the latter is rotatable in a leakless manner on its upper and lower edges 17—18, and is rotatable upon its axis. The upper wall 19 of the internal cylinder 4 is imperforate, and the cylindrical part is perforated at 13.

Upon two diametrically opposite generatrices of said internal cylinder are mounted the respective strips 6—7 which are secured by screws 8, and said strips form a leakless joint when in contact with the internal cylindrical wall of the chamber 1.

On the outer cylindrical face of said chamber 4 is mounted a wire gauze member 9 which constitutes the filtering surface proper, and said gauze is gripped between the strips 6—7 and the wall of the cage 4 in such manner as to hold it in place.

The wire gauze member 9 forms a filtering sleeve which can be readily placed in position or removed, this being done by removing the cover 2 and perforated cylinder 4, and taking off the strips 6—7. Such sleeves may consist of any suitable filtering fabric or the like, according to the case, and for instance, use will be generally made of wire gauze having the proper mesh, or in other cases, it is feasible to employ perforated sheet metal, or a sleeve consisting of a ceramic substance such as porcelain.

The cock 11 controls the intake conduit for the water to be filtered, and the cock 10 controls the discharge of the solid substances: the cock 12 controls the offtake conduit for the filtered water.

Figure 2:
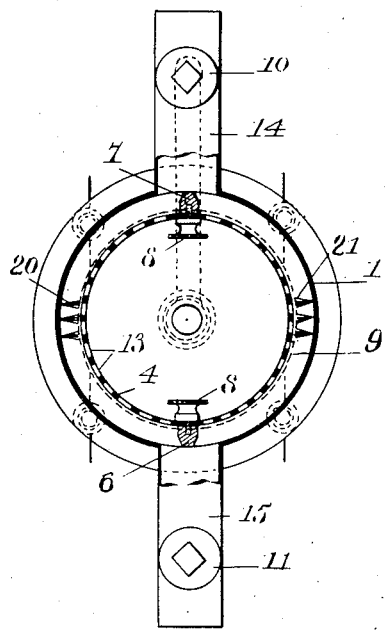
Figure 2 is a diagrammatic sectional view, on the line II—II of Figure 1.

The wire brushes 20—21 (shown in Fig. 2) are carried upon the interior of the chamber 1, and are in contact with the sleeve 9. The sets of brushes are sufficiently spaced apart to allow the liquid to circulate.

The operation is as follows, with reference to Figures 3, 4 and 5.

The water is supposed to enter at 11, and the solid material is discharged at 10.

Figure 3:
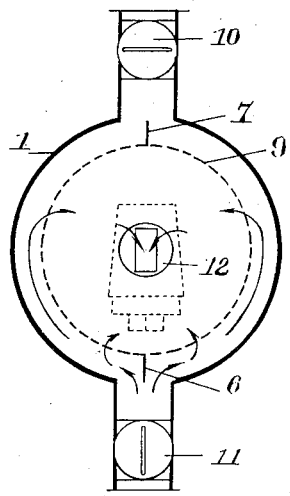
Figures 3, 4 and 5 are analogous views showing various operating positions.

Figure 3 shows the apparatus in its normal filtering operation. The cock 11 and cock 12 are open and the cock 10 is closed. The filtered water is discharged through 12. Since the whole surface of the internal chamber is under pressure, the whole surface of sleeve 9 will be utilized and will thus give the maximum yield of filtered water.

If it is desired to simply sweep off the external surface of the sleeve 9, the internal chamber is left in the preceding position while closing the cock 12 and opening the cock 10, and thus a flush of water will clean the whole device, and also cleans out the space between the sleeve 9 and the chamber 1.

Figure 4:
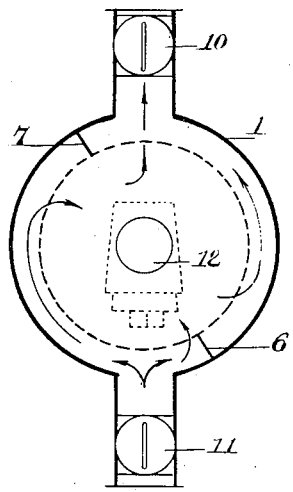

However, it is more frequently required to remove the sludge from the meshes or perforations of the sleeve 9, and in this event the operator turns the handle 5 in such manner as to place the strips 6—7 in the position shown in Figure 4, the cock 12 being closed and the cock 10 open. The water under pressure traverses the sleeve 9 at its left hand side and is discharged through its right hand side, the current in the right hand part having the contrary direction to what it had during the normal operation, and thus the said portion of the sleeve will be cleaned.

Figure 5:
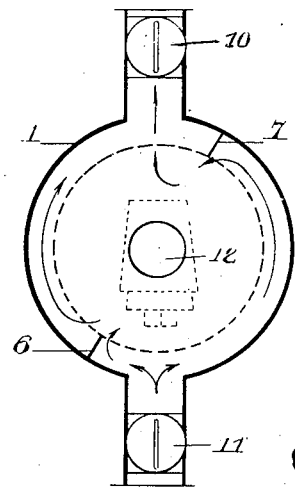

The strips 6—7 are then placed in the position shown in Figure 5, and the left hand part of the sleeve 9 will now be cleaned.

By an alternate motion of the handle 5, violent pulsations in the liquid currents are produced, and in this manner all the impurities are finally detached and evacuated.

It is thus observed that the said apparatus is of a most practical nature, since it is an easy matter to employ a single controlling device for the conjoint operation of the filtering sleeve 9 and the various cocks.

I claim:—

1. A filtering apparatus comprising a cylindrical casing having a pair of ports widely spaced around its periphery, a pair of conduits connected respectively with said ports, a cylindrical cage arranged coaxially within the casing and spaced therefrom to provide an annular chamber between the casing and cage, a filtering cloth fitted on said cage, and a pair of securing strips resting on the cloth and secured to the cage, said strips bearing against the inner wall of the casing to form a water-tight joint.

2. A filtering apparatus including a cylindrical casing closed at one end and having a valved outlet pipe leading from the closed end, said casing having an internal shoulder at the closed end, a removable closure for the opposite end of the casing and having a flat peripheral portion seated at its outer part on the wall of the casing and projecting inwardly therefrom to form a shoulder confronting the first shoulder, diametrically opposed valved pipe connections extending from the cylindrical periphery of the casing, a perforated cylinder having the end adjacent the removable closure closed and the opposite end open, a flange on the open end of the perforated cylinder fitting in the first shoulder and holding the body of the cylinder spaced from the casing wall, the closed end of the cylinder having a rib fitting against the casing closure, means attached to the perforated cylinder and projecting through the casing closure to rotate the cylinder, a filter cloth surrounding the body of the cylinder, a pair of removable ribs resting on the filter cloth and extending from the cylinder flange to the casing closure at diametrically opposite points on the cylinder, said ribs forming water-tight partitions between the cylinder and casing, and means to detachably secure the ribs to the cylinder.

MARCEL LAMORT.